Sept. 29, 1931.  W. T. REID  1,825,285
SKEW LEVER
Filed Nov. 30, 1928
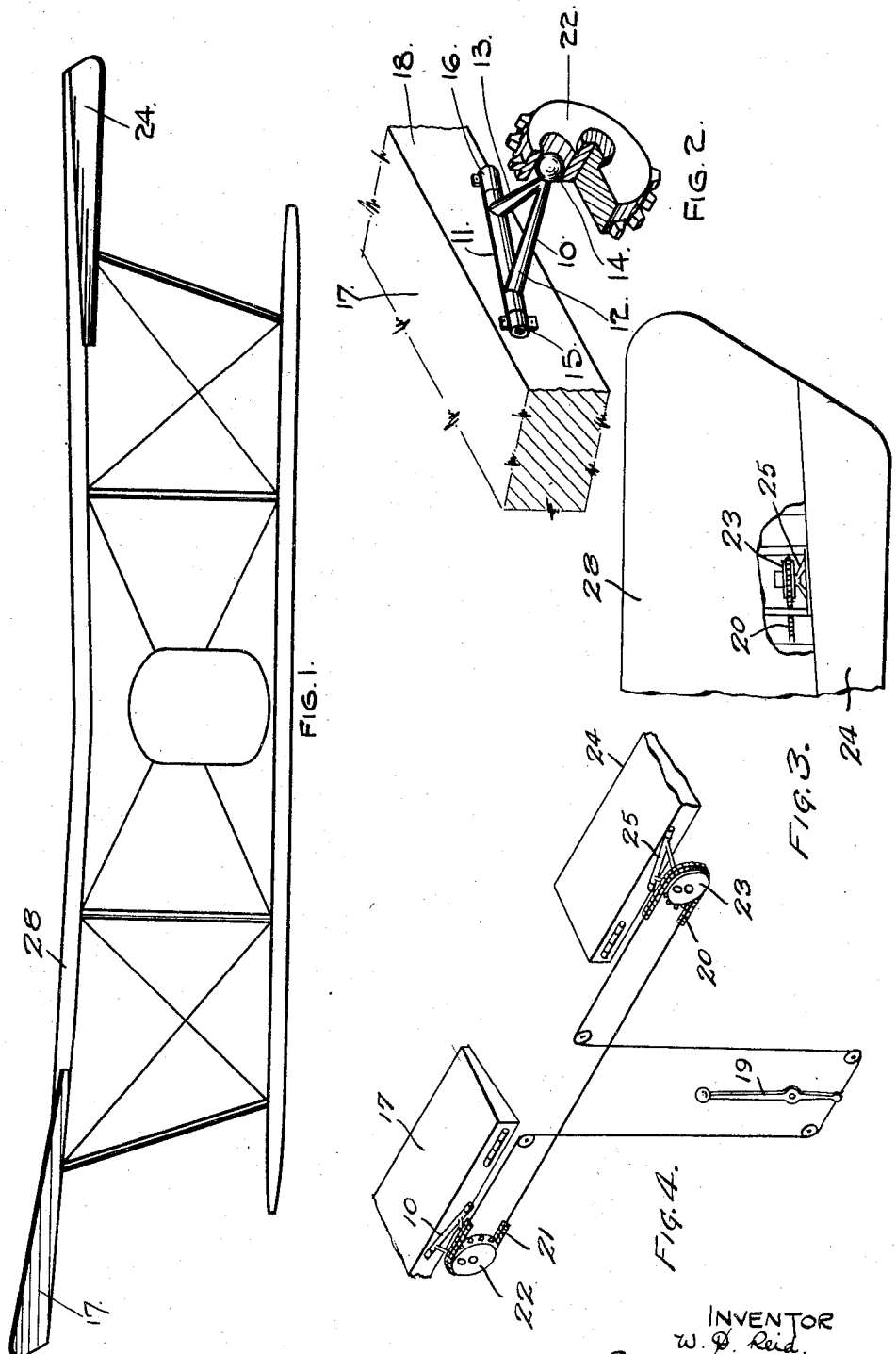
INVENTOR
W. D. Reid.
BY E.J. Fetherstonhaugh
ATTORNEY.

Patented Sept. 29, 1931

1,825,285

UNITED STATES PATENT OFFICE

WILFRID THOMAS REID, OF ST. LAURENT, QUEBEC, CANADA, ASSIGNOR TO CURTISS-REID AIRCRAFT COMPANY LIMITED, OF MONTREAL, QUEBEC, CANADA

SKEW LEVER

Application filed November 30, 1928. Serial No. 322,618.

The invention relates to skew levers, as described in the present specification and illustrated in the accompanying drawings that form part of the same.

The invention consists essentially of the novel features of construction pointed out broadly and specifically in the claim for novelty following a description containing an explanation in detail of an acceptable form of the invention.

The objects of the invention are to maintain the equilibrium of an aeroplane in manœuvring, so that the relative movements of the ailerons on either side will be adjusted according to the banking operation required, in other words, to accompany the lifting of an aileron on the one side with a differential movement of the aileron on the other side, in accordance with deductions from accepted principles; to furnish in the mechanism of aeroplanes simple and very reliable means of operating the ailerons; to contribute to the safety of pilots, observers and passengers in airships of the heavier than air type; to facilitate the operation of flying under adverse air conditions; to devise novel mechanical movement for carrying out the aforesaid purposes and any other purposes that may be likened thereto; and generally to provide an efficient, durable and serviceable leverage mechanism for imparting a differential or coincident movement on either side of the operating member.

Figure 1 is a rear elevation of an aeroplane showing the fuselage in cross section and the ailerons tilted at unequal angles due to the differential effect of this invention.

Figure 2 is a fragmentary perspective view of an aileron, showing the operating lever and joint connection.

Figure 3 is a fragmentary detail of a wing broken away to show the aileron operating parts.

Figure 4 is a diagrammatic view showing the operating connections.

Like numerals of reference indicate corresponding parts in the various figures.

Referring to the drawings, the skew lever, indicated by the numeral 10 is of angle formation, having for its base the pivot bar or rod 11, and for its other sides the bars or rods 12 and 13 converging to the ball 14, the latter forming part of a universal connection.

The pivot rod 11 is journalled in the pivot bearings 15 and 16 rigidly secured to the aileron 17, and particularly to the inner longitudinal edge face 18 of said aileron, and extending obliquely in a longitudinal direction across the centre from edge to edge.

The setting of the lever, askew on the inner edge face of the aileron depends on the distance of the movement required.

The ailerons are operated from the joystick 19, which is operatively connected to the chains 20 and 21 trained around the sprockets 22 and 23, these chains being connected across the wing of the aeroplane from aielron to aileron, that is to say, from the aileron 17 to the aileron indicated by the numeral 24, which is coincidently operated by a skew lever 25.

The ailerons 17 and 24 are connected through universal crank connections to the sprockets 22 and 23 forming ball joints in arcual directions following the rotation of the sprocket wheels, usually about one quarter of a revolution and this means differential movements in so far as the ailerons are concerned, which is desirable in aviation.

In the operation of this device, the sprockets are turned in one direction or the other, as the case may be by moving the stick sideways, and this has the effect of moving the levers 10 and 25 and of swinging one aileron upwardly and the other downwardly, as these ailerons are pivotally secured to the wing 28 but in doing this, because of the skew setting of the levers and the connections, the movement in the upward direction may be different from the movement in the downward direction and this differential operation is desirable, because in actual flying, it is not necessary, neither is it advisable for the upward and downward movements to be equal, as for instance, in making a sharp turn to the right or to the left, one aileron must turn upwardly to the extent of its movement and the other must turn downwardly to the extent of its movement, but one movement need not be as great a distance as the other, in maintaining the equilibrium of the aeroplane.

The use of this lever mechanism for aeroplanes has been particularly described, but it may be found advantageous in many other directions therefore, its application to the one use is explained in order that the invention may be fully understood.

What I claim is:—

In skew levers, the combination with an aileron of angularly formed lever having its base journalled in bearings secured to the inner edge face of the aileron and extending obliquely thereacross and its projecting bars terminating in a universal joint, a sprocket having a recess for a joint member and suitably mounted, and a chain connection to said sprocket from the operating member of an aeroplane.

Signed at Montreal, Canada, this 25th day of October, 1928.

WILFRID THOMAS REID.